United States Patent
Kook et al.

(10) Patent No.: US 9,593,745 B2
(45) Date of Patent: Mar. 14, 2017

(54) PLANETARY GEAR TRAIN OF AUTOMATIC TRANSMISSION FOR VEHICLE

(71) Applicant: Hyundai Motor Company, Seoul (KR)

(72) Inventors: Jae Chang Kook, Hwaseong-si (KR); Seong Wook Hwang, Gunpo-si (KR); Hyu Tae Shim, Hwaseong-si (KR); Seongwook Ji, Ansan-si (KR); Wonmin Cho, Hwaseong-si (KR); Kangsoo Seo, Yongin-si (KR); Myeong Hoon Noh, Seongnam-si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/923,278

(22) Filed: Oct. 26, 2015

(65) Prior Publication Data

US 2016/0333974 A1     Nov. 17, 2016

(30) Foreign Application Priority Data

May 13, 2015  (KR) .......................... 10-2015-0066904

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| 8,858,387 | B2* | 10/2014 | Haupt | F16H 3/66 |
|---|---|---|---|---|
| | | | | 475/282 |
| 2013/0210570 | A1* | 8/2013 | Mellet | F16H 3/66 |
| | | | | 475/275 |
| 2014/0100073 | A1* | 4/2014 | Lee | F16H 3/66 |
| | | | | 475/277 |
| 2014/0378269 | A1* | 12/2014 | Bockenstette | F16H 3/66 |
| | | | | 475/276 |

FOREIGN PATENT DOCUMENTS

| KR | 10-1063505 B1 | 9/2011 |
|---|---|---|
| KR | 10-2011-0131816 A | 12/2011 |
| KR | 10-2013-0077146 A | 7/2013 |
| KR | 10-1509726 B1 | 4/2015 |

* cited by examiner

*Primary Examiner* — Erin D Bishop
(74) *Attorney, Agent, or Firm* — Morgan, Lewis & Bockius LLP

(57) ABSTRACT

A planetary gear train of an automatic transmission for a vehicle may include an input shaft receiving power from an engine, an output shaft outputting power changed in speed, a first planetary gear set, a second planetary gear set, a third planetary gear set, a fourth planetary gear, a first rotating shaft selectively connected with a transmission housing, a second rotating shaft, a third rotating shaft selectively connected with the transmission housing, a fourth rotating shaft directly connected with the input shaft so as to be continuously operated as an input element, a fifth rotating shaft, a sixth rotating shaft selectively connected with the first, second, and fifth rotating shafts, a seventh rotating shaft, an eighth rotating shaft selectively connected with the seventh rotating shaft and simultaneously directly connected with the output shaft, and six friction elements.

9 Claims, 2 Drawing Sheets

FIG. 2

| GEAR | C1 | C2 | C3 | C4 | B1 | B2 |
|------|----|----|----|----|----|----|
| 1    |    | ●  |    |    | ●  | ●  |
| 2    | ●  | ●  |    |    |    | ●  |
| 3    |    | ●  |    | ●  |    | ●  |
| 4    | ●  |    |    | ●  |    | ●  |
| 5    |    |    | ●  | ●  |    | ●  |
| 6    | ●  |    | ●  |    |    | ●  |
| 7    | ●  | ●  | ●  |    |    |    |
| 8    | ●  |    | ●  |    | ●  |    |
| 9    |    |    | ●  | ●  | ●  |    |
| 10   | ●  |    |    | ●  | ●  |    |
| REV  | ●  | ●  |    |    | ●  |    |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0066904 filed May 13, 2015, the entire contents of which is incorporated herein for all purposes by this reference.

BACKGROUND OF THE INVENTION

Field of the Invention

The present invention relates to an automatic transmission for a vehicle, and more particularly, to a planetary gear train of an automatic transmission for a vehicle, which is capable of improving power transmission performance and reducing fuel consumption by implementing ten forward speeds using a minimum number of configurations.

Description of Related Art

The recent increase in oil prices has caused car makers to meet global demands for improving fuel efficiency.

Accordingly, research is being conducted on engines in terms of reducing weight and improving fuel efficiency by down-sizing, and research is also being conducted to ensure both drivability and competitiveness by maximizing fuel efficiency by implementing an automatic transmission with multiple stages.

However, in the case of the automatic transmission, the number of internal components is increased as the number of gear shift stages is increased, and as a result, the automatic transmission may be difficult to mount, the manufacturing cost and weight may be increased, and power transmission efficiency may be deteriorated.

Therefore, in order to increase an effect of improving fuel efficiency by implementing an automatic transmission with multiple stages, it is important to develop a planetary gear train capable of maximizing efficiency using a small number of components.

In this respect, recently, an eight-speed automatic transmission and a nine-speed automatic transmission have been implemented, and researches and developments are being actively conducted on a planetary gear train that may implement gear shift stages for eight or more speeds.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle, which is capable of obtaining an effect of improving power transmission performance and fuel efficiency by implementing an automatic transmission with multiple stages and implementing gear shift stages for ten forward speeds and one reverse speed using a minimum number of configurations, and also capable of improving noise reducing properties when the vehicle travels by ensuring an operating point of an engine within a low rotational speed region.

According to various aspects of the present invention, a planetary gear train of an automatic transmission for a vehicle may include an input shaft receiving power from an engine, an output shaft outputting power changed in speed, a first planetary gear set having a first sun gear, a first planet carrier, and a first ring gear, a second planetary gear set having a second sun gear, a second planet carrier, and a second ring gear, a third planetary gear set having a third sun gear, a third planet carrier, and a third ring gear, a fourth planetary gear set having a fourth sun gear, a fourth planet carrier, and a fourth ring gear, a first rotating shaft including the first and second sun gears, and selectively connected with a transmission housing, a second rotating shaft including the first planet carrier and the fourth ring gear, a third rotating shaft including the first ring gear, and selectively connected with the transmission housing, a fourth rotating shaft including the second planet carrier and the fourth sun gear, and directly connected with the input shaft so as to be continuously operated as an input element, a fifth rotating shaft including the second ring gear and the third sun gear, a sixth rotating shaft including the third planet carrier, and selectively connected with the first, second, and fifth rotating shafts, a seventh rotating shaft including the third ring gear, an eighth rotating shaft including the fourth planet carrier, and selectively connected with the seventh rotating shaft and simultaneously directly connected with the output shaft, and six friction elements disposed between the rotating shafts, and disposed at portions where the rotating shafts are selectively connected with the transmission housing.

The first, second, third, and fourth planetary gear sets may each comprise single pinion planetary gear sets.

The first, second, third, and fourth planetary gear sets may be sequentially disposed from an engine side.

The six friction elements may include a first clutch interposed between the seventh rotating shaft and the eighth rotating shaft, a second clutch interposed between the first rotating shaft and the sixth rotating shaft, a third clutch interposed between the second rotating shaft and the sixth rotating shaft, a fourth clutch interposed between the fifth rotating shaft and the sixth rotating shaft, a first brake interposed between the first rotating shaft and the transmission housing, and a second brake interposed between the third rotating shaft and the transmission housing.

Gear shift stages, which are implemented by selectively operating the six friction elements, may include a first forward gear shift stage implemented by simultaneously operating the second clutch and the first and second brakes, a second forward gear shift stage implemented by simultaneously operating the first and second clutches and the second brake, a third forward gear shift stage implemented by simultaneously operating the second and fourth clutches and the second brake, a fourth forward gear shift stage implemented by simultaneously operating the first and fourth clutches and the second brake, a fifth forward gear shift stage implemented by simultaneously operating the third and fourth clutches and the second brake, a sixth forward gear shift stage implemented by simultaneously operating the first and third clutches and the second brake, a seventh forward gear shift stage implemented by simultaneously operating the first, second, and third clutches, an eighth forward gear shift stage implemented by simultaneously operating the first and third clutches and the first brake, a ninth forward gear shift stage implemented by simultaneously operating the third and fourth clutches and the first brake, a tenth forward gear shift stage implemented by simultaneously operating the first and fourth clutches and the first brake, and a reverse gear shift stage implemented by simultaneously operating the first and second clutches and the first brake.

According to various aspects of the present invention, a planetary gear train of an automatic transmission for a vehicle may include an input shaft receiving power from an engine, an output shaft outputting power changed in speed, a first planetary gear set having a first sun gear, a first planet carrier, and a first ring gear, a second planetary gear set having a second sun gear, a second planet carrier, and a second ring gear, a third planetary gear set having a third sun gear, a third planet carrier, and a third ring gear, a fourth planetary gear set having a fourth sun gear, a fourth planet carrier, and a fourth ring gear, in which the input shaft may be directly connected to the second planet carrier and the fourth sun gear, the output shaft may be directly connected to the fourth planet carrier, the first sun gear and the second sun gear may be directly connected to each other, the first planet carrier and the fourth ring gear may be directly connected to each other, and the second ring gear and the third sun gear may be directly connected to each other, a first clutch selectively connecting the third ring gear with the fourth planet carrier, a second clutch selectively connecting the first and second sun gears with the third planet carrier, a third clutch selectively connecting the first planet carrier and the fourth ring gear with the third planet carrier, a fourth clutch selectively connecting the second ring gear and the third sun gear with the third planet carrier, a first brake selectively connecting the first and second sun gears to a transmission housing, and a second brake selectively connecting the first ring gear to the transmission housing.

According to various embodiment of the present invention, it is possible to implement the gear shift stages for ten forward speeds, by combining the four planetary gear sets, which are simple planetary gear sets, with six friction elements, thereby improving power transmission performance and fuel efficiency.

In addition, it is possible to implement the gear shift stages suitable for rotational speeds of the engine by implementing the automatic transmission with the multiple stages, and as a result, it is possible to greatly improve noise reducing properties when the vehicle travels.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table representing operations at respective gear shift stages implemented by respective friction elements applied to the exemplary planetary gear train according to the present invention.

Figure 1:
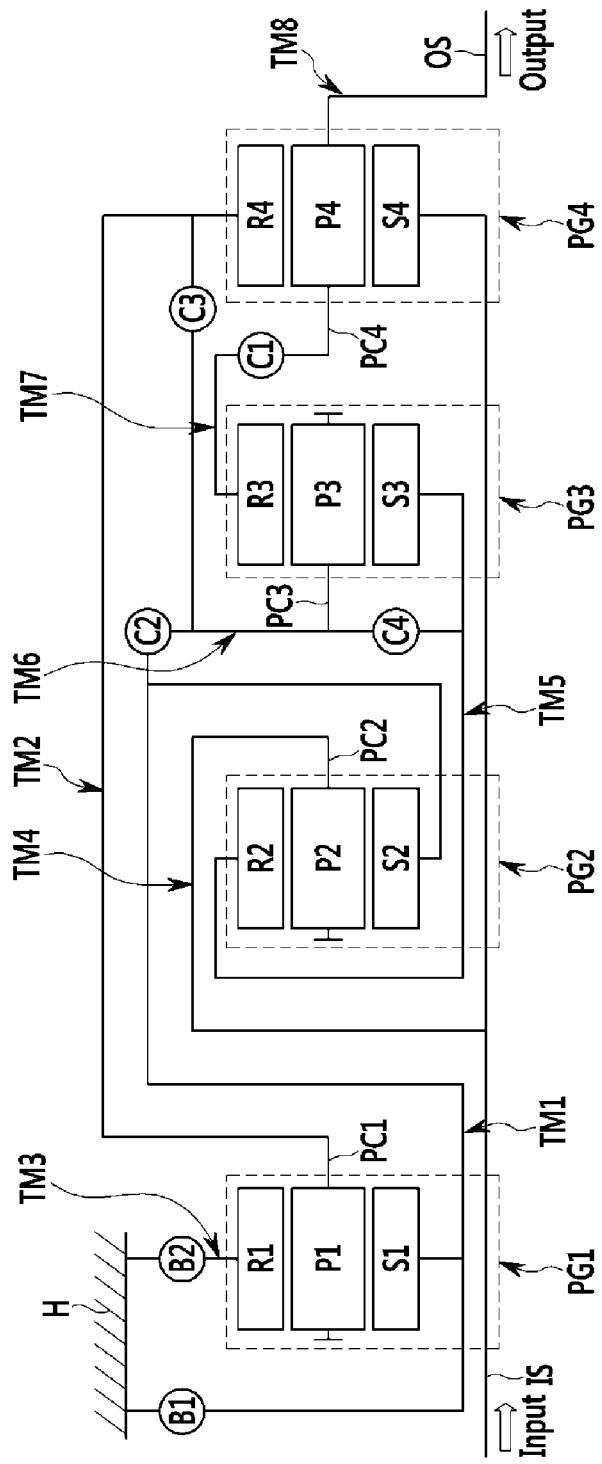
FIG. 1 is a configuration diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a configuration diagram of a planetary gear train according to various embodiments of the present invention.

Referring to FIG. 1, the planetary gear train according to various embodiments of the present invention includes first, second, third, and fourth planetary gear sets PG1, PG2, PG3, and PG4 which are coaxially disposed, an input shaft IS, an output shaft OS, eight rotating shafts TM1 to TM8 which directly connect respective rotating elements of the first, second, third, and fourth planetary gear sets PG1, PG2, PG3, and PG4, six friction elements C1 to C4, B1, and B2, and a transmission housing H.

Therefore, rotational power inputted from the input shaft IS is changed in speed by complementary operations of the first, second, third, and fourth planetary gear sets PG1, PG2, PG3, and PG4, and then outputted through the output gear OS.

Further, the respective simple planetary gear sets are disposed in the order of the first, second, third, and fourth planetary gear sets PG1, PG2, PG3, and PG4 from an engine side.

The input shaft IS is an input member, rotational power from a crankshaft of the engine is converted into torque by a torque converter, and the torque is inputted.

The output shaft OS is an output member, and transmits the driving power, which is changed in speed, to a driving shaft through a differential apparatus.

The first planetary gear set PG1 is a single pinion planetary gear set, and includes rotating elements including a first sun gear S1, a first planet carrier PC1 which supports a first pinion P1 that externally engages with the first sun gear S1, and a first ring gear R1 which internally engages with the first pinion P1.

The second planetary gear set PG2 is a single pinion planetary gear set, and includes a second sun gear S2, a second planet carrier PC2 which supports a second pinion P2 that externally engages with the second sun gear S2, and a second ring gear R2 which internally engages with the second pinion P2.

The third planetary gear set PG3 is a single pinion planetary gear set, and includes a third sun gear S3, a third planet carrier PC3 which supports a third pinion P3 that externally engages with the third sun gear S3, and a third ring gear R3 which internally engages with the third pinion P3.

The fourth planetary gear set PG4 is a single pinion planetary gear set, and includes a fourth sun gear S4, a fourth planet carrier PC4 which supports a fourth pinion P4 that externally engages with the fourth sun gear S4, and a fourth ring gear R4 which internally engages with the fourth pinion P4.

Further, one or more rotating elements of the first, second, third, and fourth planetary gear sets PG1, PG2, PG3, and PG4 are directly connected to each other, and the first, second, third, and fourth planetary gear sets PG1, PG2, PG3, and PG4 are operated while retaining the total of eight rotating shafts TM1 to TM8.

The configurations of the eight rotating shafts TM1 to TM8 will be described below.

The first rotating shaft TM1 includes the first and second sun gears S1 and S2, and is selectively connected with the transmission housing H.

The second rotating shaft TM2 includes the first planet carrier PC1 and the fourth ring gear R4.

The third rotating shaft TM3 includes the first ring gear R1, and is selectively connected with the transmission housing H.

The fourth rotating shaft TM4 includes the second planet carrier PC2 and the fourth sun gear S4, and is directly connected with the input shaft IS so as to continuously be operated as an input element.

The fifth rotating shaft TM5 includes the second ring gear R2 and the third sun gear S3.

The sixth rotating shaft TM6 includes the third planet carrier PC3, and is selectively connected with the first, second, and fifth rotating shafts TM1, TM2, and TM5.

The seventh rotating shaft TM7 includes the third ring gear R3.

The eighth rotating shaft TM8 includes the fourth planet carrier PC4, and is selectively connected with the seventh rotating shaft TM7 and simultaneously directly connected with the output shaft OS so as to continuously be operated as an output element.

Further, four clutches C1, C2, C3, and C4, which are friction elements, are disposed at portions where the respective rotating shafts of the rotating shafts TM1 to TM8 are selectively connected to each other.

In addition, two brakes B1 and B2, which are friction elements, are disposed at portions where the rotating shafts of the rotating shafts TM1 to TM8 are selectively connected with the transmission housing H.

Positions at which the six friction elements C1 to C4, B1, and B2 are disposed will be described below.

The first clutch C1 is interposed between the seventh rotating shaft TM7 and the eighth rotating shaft TM8, and allows the seventh rotating shaft TM7 and the eighth rotating shaft TM8 to be selectively integrated with each other.

The second clutch C2 is interposed between the first rotating shaft TM1 and the sixth rotating shaft TM6, and allows the first rotating shaft TM1 and the sixth rotating shaft TM6 to be selectively integrated with each other.

The third clutch C3 is interposed between the second rotating shaft TM2 and the sixth rotating shaft TM6, and allows the second rotating shaft TM2 and the sixth rotating shaft TM6 to be selectively integrated with each other.

The fourth clutch C4 is interposed between the fifth rotating shaft TM5 and the sixth rotating shaft TM6, and allows the fifth rotating shaft TM5 and the sixth rotating shaft TM6 to be selectively integrated with each other.

The first brake B1 is interposed between the first rotating shaft TM1 and the transmission housing H, and allows the first rotating shaft TM1 to be operated as a selectively fixed element.

The second brake B2 is interposed between the third rotating shaft TM3 and the transmission housing H, and allows the third rotating shaft TM3 to be operated as a selectively fixed element.

The friction elements, which include the first, second, third, and fourth clutches C1, C2, C3, and C4 and the first and second brakes B1 and B2 as described above, may be a multi-plate hydraulic frictional coupling unit that is frictionally coupled by hydraulic pressure.

Figure 2:
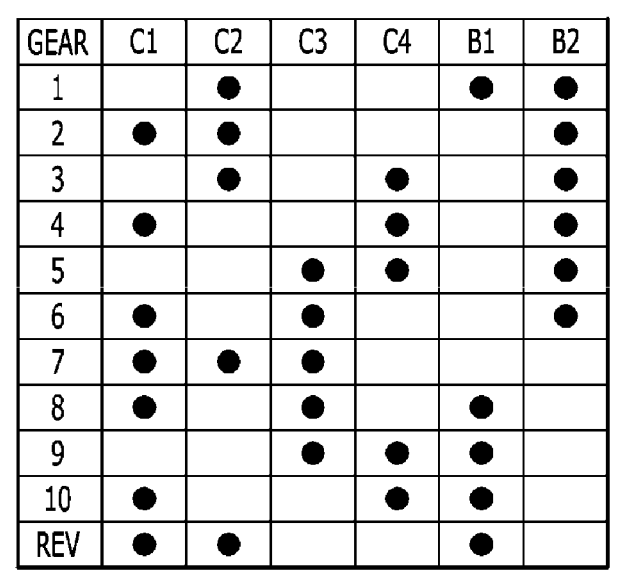

FIG. 2 is a table representing operations at respective gear shift stages implemented by respective friction elements applied to the planetary gear train according to various embodiments of the present invention.

As illustrated in FIG. 2, according to the planetary gear train according to various embodiments of the present invention, gear shift operations are carried out by operating the three friction elements at respective gear shift stages.

A gear shift stage for a first forward speed 1ST is implemented by simultaneously operating the second clutch C2 and the first and second brakes B1 and B2.

A gear shift stage for a second forward speed 2ND is implemented by simultaneously operating the first and second clutches C1 and C2 and the second brake B2.

A gear shift stage for a third forward speed 3RD is implemented by simultaneously operating the second and fourth clutches C2 and C4 and the second brake B2.

A gear shift stage for a fourth forward speed 4TH is implemented by simultaneously operating the first and fourth clutches C1 and C4 and the second brake B2.

A gear shift stage for a fifth forward speed 5TH is implemented by simultaneously operating the third and fourth clutches C3 and C4 and the second brake B2.

A gear shift stage for a sixth forward speed 6TH is implemented by simultaneously operating the first and third clutches C1 and C3 and the second brake B2.

A gear shift stage for a seventh forward speed 7TH is implemented by simultaneously operating the first, second, and third clutches C1, C2, and C3.

A gear shift stage for an eighth forward speed 8TH is implemented by simultaneously operating the first and third clutches C1 and C3 and the first brake B1.

A gear shift stage for a ninth forward speed 9TH is implemented by simultaneously operating the third and fourth clutches C3 and C4 and the first brake B1.

A gear shift stage for a tenth forward speed 10TH is implemented by simultaneously operating the first and fourth clutches C1 and C4 and the first brake B1.

A reverse gear shift stage REV is implemented by simultaneously operating the first and second clutches C1 and C2 and the first brake B1.

The aforementioned gear shift operations will be described in more detail below.

At the gear shift stage for the first forward speed 1ST, when the second clutch C2 and the first and second brakes B1 and B2 are operated simultaneously, the first rotating shaft TM1 is connected with the sixth rotating shaft TM6 such that power is inputted to the fourth rotating shaft TM4, and a gear shift operation for the first forward speed is carried out while the first and third rotating shafts TM1 and TM3 are operated as fixed elements.

At the gear shift stage for the second forward speed 2ND, when the first and second clutches C1 and C2 and the second brake B2 are operated simultaneously, the seventh rotating shaft TM7 is connected with the eighth rotating shaft TM8, and the first rotating shaft TM1 is connected with the sixth rotating shaft TM6, such that power is inputted to the fourth rotating shaft TM4, and a gear shift operation for the second forward speed is carried out while the third rotating shaft TM3 is operated as a fixed element.

At the gear shift stage for the third forward speed 3RD, when the second and fourth clutches C2 and C4 and the second brake B2 are operated simultaneously, the first rotating shaft TM1 is connected with the sixth rotating shaft TM6, and the fifth rotating shaft TM5 is connected with the sixth rotating shaft TM6, such that power is inputted to the fourth rotating shaft TM4, and a gear shift operation for the third forward speed is carried out while the third rotating shaft TM3 is operated as a fixed element.

At the gear shift stage for the fourth forward speed 4TH, when the first and third clutches C1 and C3 and the second brake B2 are operated simultaneously, the seventh rotating shaft TM7 is connected with the eighth rotating shaft TM8, and the fifth rotating shaft TM5 is connected with the sixth rotating shaft TM6, such that power is inputted to the fourth rotating shaft TM4, and a gear shift operation for the fourth forward speed is carried out while the third rotating shaft TM3 is operated as a fixed element.

At the gear shift stage for the fifth forward speed 5TH, when the third and fourth clutches C3 and C4 and the second brake B2 are operated simultaneously, the second input shaft TM2 is connected with the sixth rotating shaft TM6, and the fifth rotating shaft TM5 is connected with the sixth rotating shaft TM6, such that power is inputted to the fourth rotating shaft TM4, and a gear shift operation for the fifth forward speed is carried out while the third rotating shaft TM3 is operated as a fixed element.

At the gear shift stage for the sixth forward speed 6TH, when the first and third clutches C1 and C3 and the second brake B2 are operated simultaneously, the seventh rotating shaft TM7 is connected with the eighth rotating shaft TM8, and the second rotating shaft TM2 is connected with the sixth rotating shaft TM6, such that power is inputted to the fourth rotating shaft TM4, and a gear shift operation for the sixth forward speed is carried out while the third rotating shaft TM3 is operated as a fixed element.

At the gear shift stage for the seventh forward speed 7TH, when the first, second, and third clutches C1, C2, and C3 are operated simultaneously, the seventh rotating shaft TM7 is connected with the eighth rotating shaft TM8, and the first rotating shaft TM1 is connected with the sixth rotating shaft TM6, such that all of the above rotating shafts are directly connected, and as a result, while power is inputted to the fourth rotating shaft TM4, a gear shift operation for the seventh forward speed, which outputs the inputted power as it is, is carried out.

At the gear shift stage for the eighth forward speed 8TH, when the first and third clutches C1 and C3 and the first brake B1 are operated simultaneously, the seventh rotating shaft TM7 is connected with the eighth rotating shaft TM8, and the second rotating shaft TM2 is connected with the sixth rotating shaft TM6, such that power is inputted to the fourth rotating shaft TM4, and a gear shift operation for the eighth forward speed is carried out while the first rotating shaft TM1 is operated as a fixed element.

At the gear shift stage for the ninth forward speed 9TH, when the third and fourth clutches C3 and C4 and the first brake B1 are operated simultaneously, the second input shaft TM2 is connected with the sixth rotating shaft TM6, and the fifth rotating shaft TM5 is connected with the sixth rotating shaft TM6, such that power is inputted to the fourth rotating shaft TM4, and a gear shift operation for the ninth forward speed is carried out while the first rotating shaft TM1 is operated as a fixed element.

At the gear shift stage for the tenth forward speed 10TH, when the first and fourth clutches C1 and C4 and the first brake B1 are operated simultaneously, the seventh rotating shaft TM7 is connected with the eighth rotating shaft TM8, and the fifth rotating shaft TM5 is connected with the sixth rotating shaft TM6, such that power is inputted to the fourth rotating shaft TM4, and a gear shift operation for the tenth forward speed is carried out while the first rotating shaft TM1 is operated as a fixed element.

At the reverse gear shift stage REV, when the first and second clutches C1 and C2 and the first brake B1 are operated simultaneously, the seventh rotating shaft TM7 is connected with the eighth rotating shaft TM8, and the first rotating shaft TM1 is connected with the sixth rotating shaft TM6, such that power is inputted to the fourth rotating shaft TM4, and a reverse gear shift operation is carried out while the first rotating shaft TM1 is operated as a fixed element.

As described above, the planetary gear train according to various embodiments of the present invention may implement the gear shift stages for ten forward speeds and one reverse speed by operating and controlling the four planetary gear sets PG1, PG2, PG3, and PG4 using the four clutches C1, C2, C3, and C4 and the two brakes B1 and B2.

Therefore, the planetary gear train according to various embodiments of the present invention may improve power transmission efficiency and fuel efficiency by implementing the automatic transmission with the multiple stages.

In addition, it is possible to implement the gear shift stages suitable for rotational speeds of the engine by implementing the automatic transmission with the multiple stages, and as a result, it is possible to greatly improve noise reducing properties when the vehicle travels.

In addition, since the three friction elements are operated for each gear shift stage, the number of friction elements which are not operated is minimized to reduce a loss caused by frictional drag, thereby improving power transmission efficiency and fuel efficiency.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, the planetary gear train comprising:
   an input shaft receiving power from an engine;
   an output shaft outputting power changed in speed;
   a first planetary gear set having a first sun gear, a first planet carrier, and a first ring gear;
   a second planetary gear set having a second sun gear, a second planet carrier, and a second ring gear;
   a third planetary gear set having a third sun gear, a third planet carrier, and a third ring gear;
   a fourth planetary gear set having a fourth sun gear, a fourth planet carrier, and a fourth ring gear;

a first rotating shaft including the first and second sun gears, and selectively connected with a transmission housing;

a second rotating shaft including the first planet carrier and the fourth ring gear;

a third rotating shaft including the first ring gear, and selectively connected with the transmission housing;

a fourth rotating shaft including the second planet carrier and the fourth sun gear, and directly connected with the input shaft so as to be continuously operated as an input element;

a fifth rotating shaft including the second ring gear and the third sun gear;

a sixth rotating shaft including the third planet carrier, and selectively connected with the first, second, and fifth rotating shafts;

a seventh rotating shaft including the third ring gear;

an eighth rotating shaft including the fourth planet carrier, and selectively connected with the seventh rotating shaft and simultaneously directly connected with the output shaft; and six friction elements, each of the six friction elements disposed between two of the rotating shafts, or disposed such that one of the rotating shafts is selectively connected with the transmission housing.

2. The planetary gear train of claim 1, wherein the first, second, third, and fourth planetary gear sets each comprise single pinion planetary gear sets.

3. The planetary gear train of claim 1, wherein the first, second, third, and fourth planetary gear sets are sequentially disposed from an engine side.

4. The planetary gear train of claim 1, wherein the six friction elements include:
 a first clutch interposed between the seventh rotating shaft and the eighth rotating shaft;
 a second clutch which is interposed between the first rotating shaft and the sixth rotating shaft;
 a third clutch which is interposed between the second rotating shaft and the sixth rotating shaft;
 a fourth clutch which is interposed between the fifth rotating shaft and the sixth rotating shaft;
 a first brake which is interposed between the first rotating shaft and the transmission housing; and
 a second brake which is interposed between the third rotating shaft and the transmission housing.

5. The planetary gear train of claim 4, wherein gear shift stages, which are implemented by selectively operating the six friction elements, include:
 a first forward gear shift stage implemented by simultaneously operating the second clutch and the first and second brakes;
 a second forward gear shift stage implemented by simultaneously operating the first and second clutches and the second brake;
 a third forward gear shift stage implemented by simultaneously operating the second and fourth clutches and the second brake;
 a fourth forward gear shift stage implemented by simultaneously operating the first and fourth clutches and the second brake;
 a fifth forward gear shift stage implemented by simultaneously operating the third and fourth clutches and the second brake;
 a sixth forward gear shift stage implemented by simultaneously operating the first and third clutches and the second brake;
 a seventh forward gear shift stage implemented by simultaneously operating the first, second, and third clutches;
 an eighth forward gear shift stage implemented by simultaneously operating the first and third clutches and the first brake;
 a ninth forward gear shift stage implemented by simultaneously operating the third and fourth clutches and the first brake;
 a tenth forward gear shift stage implemented by simultaneously operating the first and fourth clutches and the first brake; and
 a reverse gear shift stage implemented by simultaneously operating the first and second clutches and the first brake.

6. A planetary gear train of an automatic transmission for a vehicle, the planetary gear train comprising:
 an input shaft receiving power from an engine;
 an output shaft outputting power changed in speed;
 a first planetary gear set having a first sun gear, a first planet carrier, and a first ring gear;
 a second planetary gear set having a second sun gear, a second planet carrier, and a second ring gear;
 a third planetary gear set having a third sun gear, a third planet carrier, and a third ring gear;
 a fourth planetary gear set having a fourth sun gear, a fourth planet carrier, and a fourth ring gear,
 wherein the input shaft is directly connected to the second planet carrier and the fourth sun gear,
 the output shaft is directly connected to the fourth planet carrier,
 the first sun gear and the second sun gear are directly connected to each other,
 the first planet carrier and the fourth ring gear are directly connected to each other, and
 the second ring gear and the third sun gear are directly connected to each other;
 a first clutch selectively connecting the third ring gear with the fourth planet carrier;
 a second clutch selectively connecting the first and second sun gears with the third planet carrier;
 a third clutch selectively connecting the first planet carrier and the fourth ring gear with the third planet carrier;
 a fourth clutch selectively connecting the second ring gear and the third sun gear with the third planet carrier;
 a first brake selectively connecting the first and second sun gears to a transmission housing; and
 a second brake selectively connecting the first ring gear to the transmission housing.

7. The planetary gear train of claim 6, wherein the first, second, third, and fourth planetary gear sets each comprise single pinion planetary gear sets.

8. The planetary gear train of claim 6, wherein the first, second, third, and fourth planetary gear sets are sequentially disposed from an engine side.

9. The planetary gear train of claim 6, wherein gear shift stages, which are implemented by selectively operating the first, second, third, and fourth clutches and the first and second brakes, include:
 a first forward gear shift stage implemented by simultaneously operating the second clutch and the first and second brakes;
 a second forward gear shift stage implemented by simultaneously operating the first and second clutches and the second brake;
 a third forward gear shift stage implemented by simultaneously operating the second and fourth clutches and the second brake;

a fourth forward gear shift stage implemented by simultaneously operating the first and fourth clutches and the second brake;
a fifth forward gear shift stage implemented by simultaneously operating the third and fourth clutches and the second brake;
a sixth forward gear shift stage implemented by simultaneously operating the first and third clutches and the second brake;
a seventh forward gear shift stage implemented by simultaneously operating the first, second, and third clutches;
an eighth forward gear shift stage implemented by simultaneously operating the first and third clutches and the first brake;
a ninth forward gear shift stage implemented by simultaneously operating the third and fourth clutches and the first brake;
a tenth forward gear shift stage implemented by simultaneously operating the first and fourth clutches and the first brake; and
a reverse gear shift stage implemented by simultaneously operating the first and second clutches and the first brake.

* * * * *